United States Patent [19]

Caswell

[11] 4,249,905
[45] Feb. 10, 1981

[54] TREATMENT OF CEMENT COPPER

[75] Inventor: Bruce F. Caswell, Whitmore Lake, Mich.

[73] Assignee: Arcanum Corporation, Ann Arbor, Mich.

[21] Appl. No.: 907,130

[22] Filed: May 18, 1978

[51] Int. Cl.³ .............................................. C22B 1/14
[52] U.S. Cl. ..................................... 23/313 R; 209/5
[58] Field of Search ........................ 209/5; 23/313 R; 75/3-5; 210/49, 59; 423/34, 42, 43

[56] References Cited

U.S. PATENT DOCUMENTS

| 1,585,755 | 5/1926 | Borcherdt | 209/5 |
| 3,268,071 | 8/1966 | Puddington et al. | 209/5 |
| 3,368,004 | 2/1968 | Sirianni et al. | 264/117 |
| 4,003,737 | 1/1977 | Caswell et al. | 209/5 |

Primary Examiner—Hiram Bernstein
Attorney, Agent, or Firm—Blanchard, Flynn, Thiel, Boutell & Tanis

[57] ABSTRACT

An aqueous pulp or slurry containing cement copper particles is treated with conditioner and hydrophobic bridging liquid to form agglomerates of the cement copper particles, which agglomerates are then separated from the aqueous phase.

11 Claims, 3 Drawing Figures

TREATMENT OF CEMENT COPPER

BACKGROUND OF THE INVENTION

Field of the Invention

This invention relates to the treatment of aqueous slurries or pulps of cement copper in order to recover agglomerates of cement copper which are substantially free of water.

Copper is recovered by leaching low grade copper ores and various waste materials containing low amounts of copper, such as tailings from ore concentrating procedures and the stripped overburden from open pit mining. Water is used as a leaching liquid when copper is to be recovered from a sulfide material and dilute sulfuric acid is used as the leaching liquid when copper is to be recovered from an oxide material. The leaching liquid is slowly percolated through a bed of the ore or waste material and soluble salts are dissolved therein. The leaching liquid containing dissolved copper salts flows through the bed by natural drainage and it is collected and fed to a precipitation plant. The dissolved copper content in the leaching liquid is precipitated by contacting the leaching liquid with iron. The precipitated copper is commonly referred to, in the industry, as "cement copper" and that term will be used in the following description. Cement copper usually assays from about 60 to about 90% copper, with the balance being various impurities such as Fe, S, $Al_2O_3$ and $SiO_2$. It is recovered in the form of a thick slurry or pulp, typically containing about 40 wt. % of water and the balance is solids.

Essentially all of the cement copper particles produced in this way have particle sizes such that they will pass through a 100 mesh screen and, usually, 50 wt. % or more of the cement copper particles will pass through a 325 mesh screen. The slurry or pulp of cement copper can be partially dewatered by filtration, but this can be relatively difficult and expensive to perform because of the fine particle size of the cement copper. Dewatering of the cement copper by drying also is difficult because of the tendency of the cement copper to form oxide. Moreover, the prior processes for treating cement copper did not increase the particle size thereof. The small particle size of cement copper can cause problems in feeding the cement copper to the reverberatory or converter furnaces and in operting the furnaces. Thus, it is desired to treat an aqueous slurry or pulp of cement copper in order to recover the cement copper in a better state for use as a feed in the copper smelting and refining process.

It is an object of this invention to provide a process for treating an aqueous cement copper slurry or pulp to obtain substantially dry agglomerates of cement copper which can be charged as a feed to reverberatory furnaces, converters, etc., in a copper smelting and refining process.

It is another object of this invention to provide a modified process in which relatively large-size pellets of cement copper can be formed by pelletizing the cement copper agglomerates.

It is another object of this invention to provide a process, as aforesaid, in which agglomerates or pellets of cement copper can be calcined to increase the green strength thereof.

It is a further object of this invention to provide a process, as aforesaid, which is inexpensive and simple to perform, and which can be performed using conventional, readily available equipment.

The broad process of forming an agglomerated product, such as a pellet or a ball, from a liquid suspension of solid material or materials in a finely divided form has long been known and certain specific processes utilizing the basic concept are set forth in a variety of United States and other patents. Examples of these patents are those to Puddington and Farnand U.S. Pat. No. 3,268,071, Sirianni and Puddington U.S. Pat. No. 3,368,004 and Capes et al. U.S. Pat. No. 3,471,267. Briefly, all three of these patents refer to a procedure wherein the powders are suspended in a first liquid which is lyophobic to said powders, a second or bridging liquid is then added thereto which is chosen or treated so as to be lyophilic to at least certain of said powders and the system is then agitated. This forms the material which is lyophilic to the bridging liquid into a plurality of agglomerates whose size and shape depend on the details of said procedure as same are set forth at length in said patents and to which reference is invited. These procedures may be and are used both for the separation of one of a mixture of solids from such mixture and such is the main purpose of the above-mentioned Puddington U.S. Pat. No. 3,268,071, or they may be and are used where the formation of an agglomerated product is the objective itself of the agglomeration procedure and such is the principal purpose of the other two patents above-named.

The invention provides a process for treating aqueous cement copper slurries or pulps and forming agglomerates of the cement copper particles contained in such slurries or pulps, which comprises the steps of:

a. adding to the aqueous slurry or pulp of cement copper, (i) hydrophobic organic liquid and (ii) liquid conditioner effective to render hydrophobic the surfaces of the cement copper particles, whereby to displace the water from the surfaces of the cement copper particles whereby the cement copper particles are preferentially wetted by the hydrophobic organic liquid and there is formed a two-phase liquid system containing said cement copper particles wetted by the organic liquid phase and the water phase is essentially free of cement copper particles, b. agitating the two-phase liquid system to effect repeated collisions of said cement copper particles and thereby forming in said system a dispersion in water of agglomerates, said agglomerates consisting essentially of said solid cement copper particles connected by liquid bridges of said hydrophobic organic liquid and said particles having said conditioner adsorbed thereon and wherein said agglomerates may contain some water trapped in the interstitial spaces therein, c. discontinuing said agitation and separating said agglomerates from the freely drainable water contained in the dispersion obtained in step (b), and d. then drying said agglomerates and removing as much as possible of said hydrophobic liquid, said conditioner and trapped water therefrom whereby to obtain substantially dry agglomerates.

According to a second embodiment of the invention, there is provided a process which comprises the steps (a), (b), (c) and (d), as set forth above, followed by the steps of e. suspending said agglomerates obtained in step (d) in an additional quantity of hydrophobic organic suspending liquid, adding a binding agent for said agglomerates and an aqueous bridging liquid thereto, whereby to displace said hydrophobic organic suspending liquid from the surfaces of said agglomerates and the surfaces of said agglomerates are wetted with said aqueous bridging liquid containing said binding agent whereby to form a two-phase liquid system in which said agglomerates and binding agent are wetted by aqueous bridging liquid phase and said hydrophobic organic suspending liquid is essentially free of agglomerates and binding agent, and agitating the latter two-phase liquid system to effect repeated collisions of said agglomerates and thereby forming a dispersion of pellets in said hydrophobic organic suspending liquid wherein the pellets consist essentially of agglomerates connected by liquid bridges of water and said pellets are impregnated and/or coated with and bound together by said binding agent, f. discontinuing the agitation and separating the pellets from the freely drainable hydrophobic organic liquid contained in the dispersion obtained in step (e), and g. then drying said pellets and removing as much as possible of residual hydrophobic organic suspending liquid and water therefrom whereby to obtain substantially dry pellets of cement copper.

According to a further modification of the invention, the agglomerates obtained in step (d) or the pellets obtained in step (g) can be calcined to remove residual volatile matter contained therein and to increase the strength thereof.

Inasmuch as the present invention can make use of well-known equipment, the details of suitable equipment are not disclosed herein. Reference may be made to the three patents noted above, particularly U.S. Pat. Nos. 3,368,004 and 3,471,267 for further details concerning useful equipment and details of agglomeration procedures.

Figure 1:
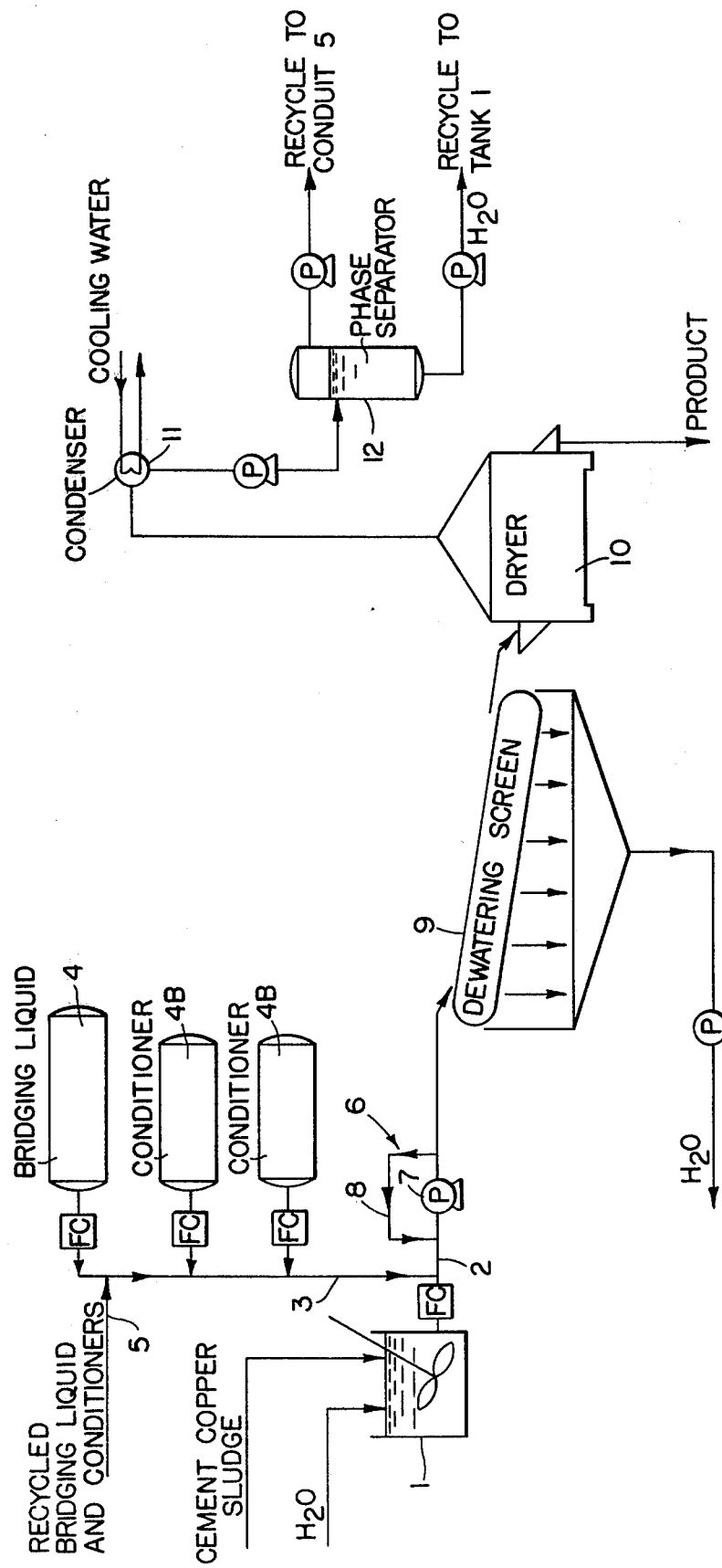
FIG. 1 is a schematic flow diagram of one embodiment of the process of the invention.

As described above, the aqueous slurry or pulp of cement copper treated by the process of the present invention is the product of the process of precipitating copper from an aqueous solution of its salts by contacting said solution with iron. This process is performed in various kinds of equipment such as launders, rotating drums and inverted cone precipitators. The cement copper slurry or pulp usually contains from about 20 to about 70 percent by weight of solids having a particle size of minus 100 mesh and the balance thereof is essentially water. Usually the cement copper slurry or pulp is not easily pumpable by centrifugal pumps because of its high solids content. If this is the case, the cement copper aqueous slurry or pulp is first mixed with water in a mixing tank 1 so as to produce an aqueous, easily pumpable slurry containing 20 wt. % or less of solids.

The following description will refer to cement copper solids. In addition to copper, these solids usually contain minor amounts of other solid impurities. These solid impurities will remain with the copper in the process according to the invention and they will be present in the final agglomerate or pellet product. Because the final agglomerate or pellet product is used as a feed to the smelting stage, the presence of these solid impurities is not objectionable and removal thereof is not required.

The aqueous slurry is fed through a conduit 2. A mixture of treating liquids which preferentially wets the solid particles of the slurry is flowed through conduit 3 and is combined with the slurry in the conduit 2. During start-up of the process, the treating liquids are fed from the tanks 4, 4A and 4B into the conduit 3, by means of pumps and flow controllers (FC) as shown. During steady-state operation, most of the mixture of treating liquids is recycled treating liquid supplied from conduit 5 and "make-up" treating liquid is supplied from tanks 4, 4A and 4B as needed.

The mixture of treating liquids is comprised of (1) a hydrophobic bridging liquid which displaces the water from the surfaces of the suspended cement copper solids and (2) one or more conditioners, two conditioners in this instance, which change the wetting properties of the cement copper solids of the slurry by being selectively adsorbed on the surfaces of the cement copper particles to alter their normal surface properties, whereby the bridging liquid can displace the water from and can wet the surfaces of the solid particles.

Useful bridging liquids include hydrophobic organic liquids such as liquid hydrocarbons including fuel oil and kerosene, chlorinated hydrocarbons such as perchloroethylene, and trichloroethane, and the like. The hydrophobic organic liquids are referred to as bridging liquids in view of their function of creating bridges between the solid cement copper particles whereby to form agglomerates. Conditioners are polar organic substances which are adsorbed on the cement copper particles at the solid-liquid interface. The conditioner will usually have a balanced hydrophilic-hydrophobic molecular structure and it is adsorbed on the solid with the hydrophobic (hydrocarbon) portion oriented outwardly so that the cement copper particles will be wetted by the bridging liquid. The polar groups of the conditioners are adsorbed on the cement copper particles. The cement copper surface becomes covered with polar molecules containing a substantial proportion of hydrocarbon groups so that the surface becomes oleophilic whereby the cement copper particles become wetted by the hydrophobic organic liquid phase and the water phase becomes essentially free of cement copper particles. Organic acids such as tall oil, xanthates, alcohols and long chain aliphatic amines, particularly primary amines $RNH_2$ wherein R is alkyl having 4 to 18 carbon atoms, all having a large hydrocarbon nucleus, are useful as conditioners, according to the invention.

In the illustrated embodiment, trichloroethane is employed as the bridging liquid. The conditioner is comprised of approximately equal amounts of tall oil and cocoamine. The amounts of bridging liquid and conditioner are selected so that good quality, reasonably dense agglomerates are obtained in the following agglomeration step. The amounts can be determined by routine experimentation on the particular suspension of cement copper being treated. U.S. Pat. No. 3,368,004 describes the criteria for selecting the proportions and reference can be made thereto for additional description concerning this. Typically, the amount of conditioner (total of tall oil and cocoamine in the disclosed embodiment) is from about 0.1 to 10% by weight and the amount of bridging liquid is from about 6 to 20% by weight, both percentages being based on the weight of the cement copper solids in the cement copper slurry.

The streams of the aqueous cement copper slurry and the mixture of conditioners and bridging liquid are combined in conduit 2. The flow rates of the various fluid streams are controlled by flow controllers (FC) in a conventional way. The combined stream is agitated in an agglomeration mechanism 6 whereby to form agglomerates of the cement copper solids present in the starting cement copper slurry. The agitating and agglomerating mechanism 6 can be selected from among the equipment known to be useful for this purpose including reciprocal shakers, rotating drums, pump loops (shown in the drawing), tanks with propeller-type agitators and in-line mixers. The particular equipment used will depend on the desired properties of the agglomerates, i.e. density. Shakers will be used when agglomerates of high density and strength are wanted. However, for most purposes, the agglomerates formed in the agglomeration mechanism 6 need not possess high density and strength. Under these circumstances a pump loop is a highly effective agitating and agglomerating apparatus and is preferred because of its ease of operation.

In the illustrated apparatus, the agglomeration mechanism 6 is a pump loop comprised of a centrifugal pump 7 and a feedback conduit 8 for returning a selected portion of the discharge of the pump to the inlet thereof. If desired, a flow controller (not shown) can be provided in the feedback conduit 8 for adjusting the flow rate of the recycle stream and thereby controlling the average residence time of the combined stream in the pump loop. During the time they are present in the pump loop, the finely divided solid cement copper particles in the cement copper slurry are formed into compact agglomerates wherein the finely divided particles are held together owing to the formation of liquid bridges between the particles caused by the presence of the bridging liquid. The bridging liquid is insoluble in and is immiscible with the aqueous liquid phase and it preferentially wets the finely divided particles by displacing the aqueous phase, whereby to cause the particles to bond together. The agglomerate product discharged from the pump loop 6 is a slurry or suspension of agglomerates in an aqueous liquid phase. The agglomerates themselves consist essentially of the cement copper particles, the conditioners and the bridging liquid, wherein the conditioners are adsorbed on the cement copper particles and the bridging liquid is present as bridges between the particles. Some water usually is trapped in interstitial spaces in the agglomerates. The particle size of the agglomerates is such that they can be readily separated from the freely drainable aqueous liquid phase. Usually the agglomerates have a particle size of from about 1/32 to ⅛ inch, although larger size and smaller size agglomerates can be formed if desired by adjusting the average residence time in the agglomeration mechanism 6.

The agglomerates are then separated from the freely drainable aqueous phase. In the illustrated embodiment, the slurry discharged from the pump loop 6 is fed onto a screen 9 wherein the freely drainable water passes through the screen. Other apparatuses that can be used for this purpose are filters, settling vessels and centrifuges. The agglomerates, removed as the overflow, are then fed to a dryer 10 wherein they are heated to a temperature effective to vaporize therefrom the water remaining therein, plus the conditioners and bridging liquid. For example, the dryer can be heated at a temperature of about 350° F. It is normally not necessary to remove all of the water, conditioner and bridging liquid from the agglomerates and the agglomerate product can contain minor amounts of these materials, such as up to about 1 wt. % of water and up to about 0.2 wt. % of conditioners.

The vapors from the dryer 10 are condensed in a condenser 11 and the condensate is fed to a separation tank 12 wherein the aqueous phase is separated from the organic phase. The aqueous underflow can be recycled to tank 1. The organic phase is recycled to conduit 5.

The substantially dry agglomerates discharged from the dryer 10 consist essentially of the solids contained in the starting sludge. They may still contain minor amounts of the liquids, usually less than about 2 wt. %. They are useful as a feed material to the concentrator or to a reverberatory furnace in a copper smelting process.

Figure 2A:
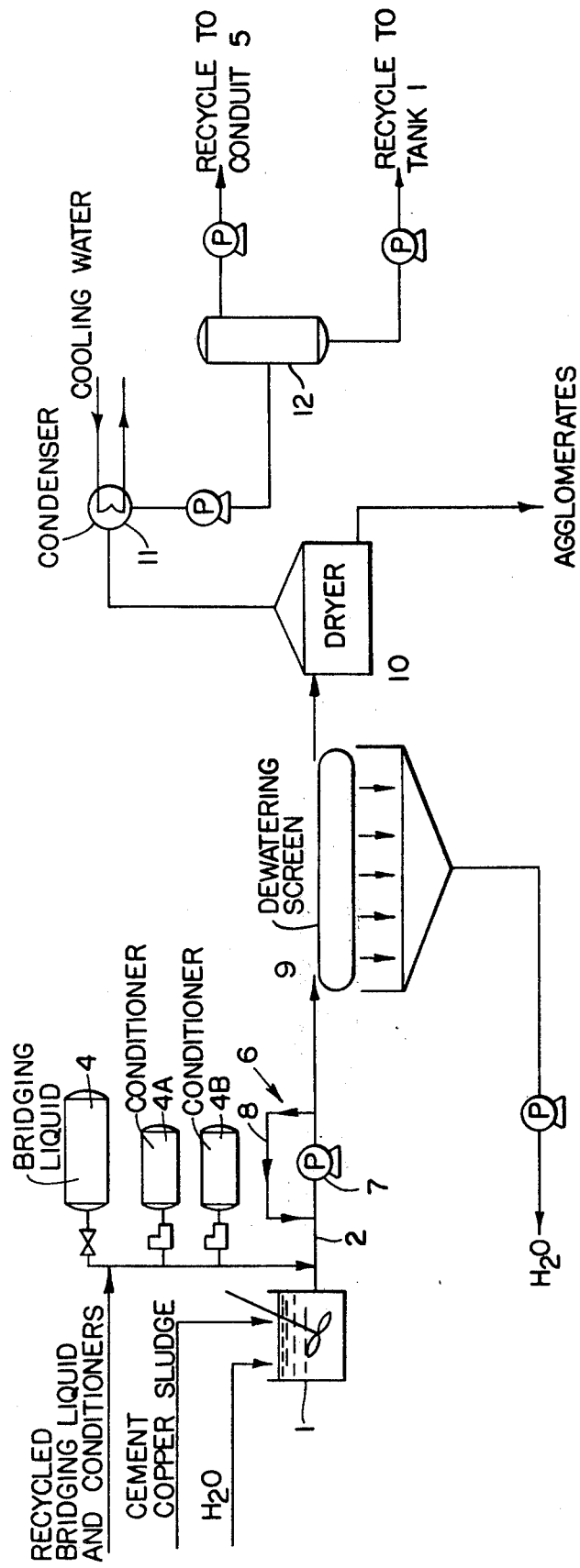
FIGS. 2A and 2B, together, comprise a schematic flow diagram of a second embodiment of the invention.
Figure 2B:
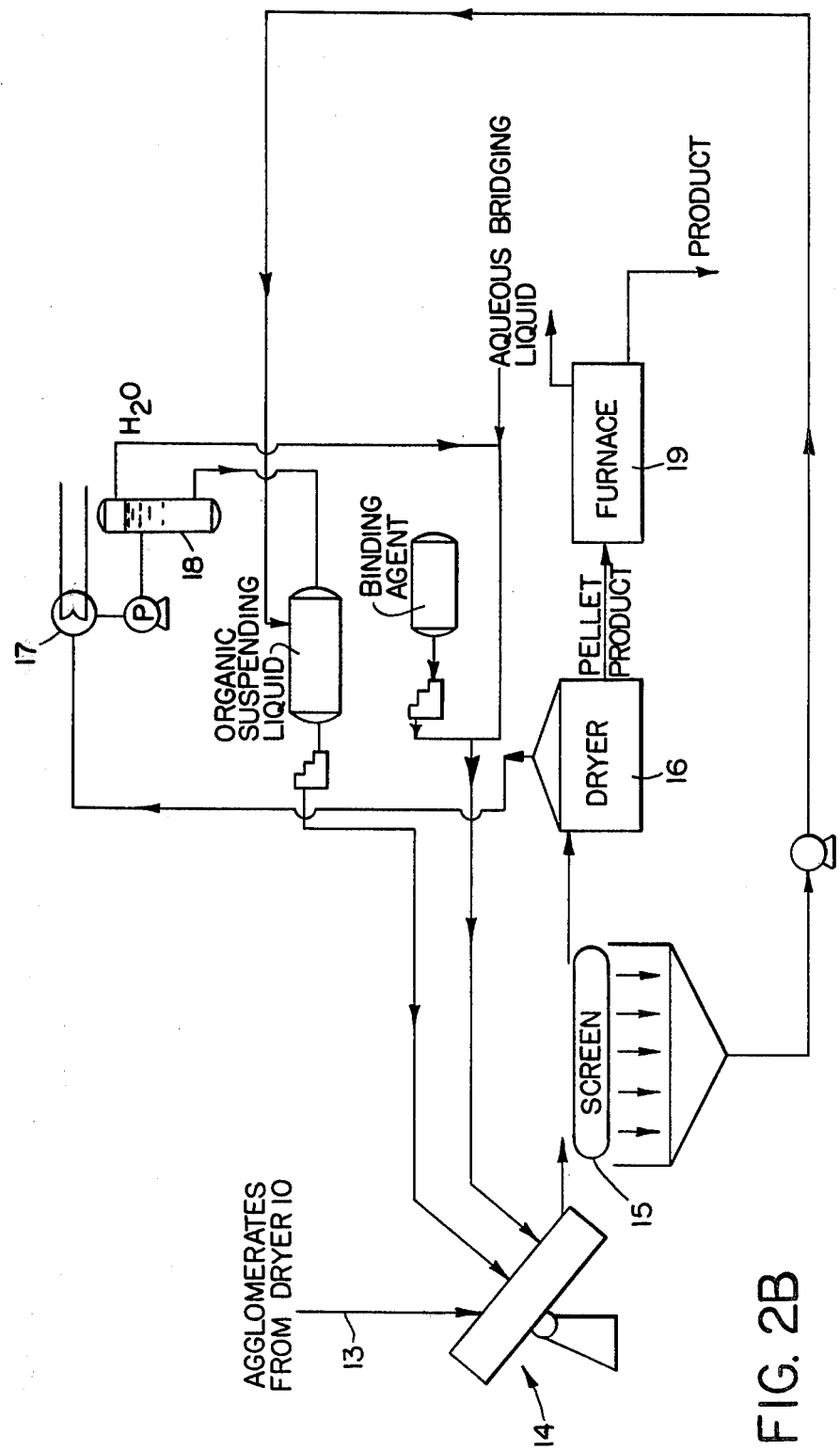

Referring to FIGS. 2A and 2B, there is shown a modified process wherein the agglomerates obtained in dryer 10 are transformed into pellets and then the pellets are calcined. The agglomerates discharged from dryer 10 are flowed through conduit 13 into a mixing and agglomerating vessel 14. An additional quantity of hydrophobic organic suspending liquid is added to the vessel 14 in an amount sufficient to form a pumpable suspension or slurry thereof, for example, to form a slurry containing up to about 20% by weight of the agglomerates. The hydrophobic organic suspending liquid can be the same as the bridging liquid supplied through conduit 3, as above described, or it can be a different organic liquid. That is, the hydrophobic organic suspending liquid added to vessel 14 can be a liquid hydrocarbon, such as fuel oil or kerosene, or a chlorinated hydrocarbon, such a perchloroethylene or tetrachloroethane. No conditioner is added to the vessel 14. Thus, the organic suspending liquid merely acts as a suspension liquid because the agglomerates are substantially oleophobic at this time since they contain little or no conditioner.

The hydrophobic organic suspending liquid and the agglomerates are mixed in the vessel 14 so as to form a suspension thereof. Then a mixture of an aqueous bridging liquid, such as water, and a binding agent is fed into the agglomerating vessel 14 and agitation is effected therein whereby further collisions occur between the agglomerates and particle size growth of the solids can take place. The aqueous bridging liquid preferentially wets the surfaces of the agglomerates and displaces the hydrophobic organic suspending liquid phase therefrom, and the aqueous bridging liquid causes the agglomerates to bond together by forming liquid bridges between the agglomerates. The operation performed in the second agglomeration mechanism 14 can be considered to be a reverse agglomeration in comparison with the agglomeration performed in the first agglomeration mechanism 6, in the sense that in the second agglomeration mechanism 14 the bridging liquid is an aqueous liquid and the suspending liquid is an organic liquid. Because the cement copper solids in mechanism 14 do not contain conditioner, they exhibit their natural hydrophilic property so that water is effective as a bridging agent. Also, the binding agent becomes intimately associated with the relatively large size pellets that are formed in the mechanism 14 whereby to bond the solids to each other to form more stable pellets. The particle size of the pellets produced in mechanism 14 is usually somewhat larger, typically from about 50 to about 200 percent larger, than the size of the agglomerates obtained in mechanism 6, but the particle size can be adjusted by varying the residence time in the mechanism 14.

The agglomerating mechanism 14 is shown as being a rotating drum which rotates about an inclined axis. It will be understood, however, that other mechanisms can be used to form the suspension of the cement copper solids in the hydrophobic organic suspending liquid and then agglomerate same with aqueous bridging liquid and binder. For example, there can be used a mixing vessel and a pump loop, like the vessel 1 and pump loop 6.

The binding agent supplied to the agglomerating mechanism 14 can be selected from inorganic binding agents and organic binding agents which do not interfere with smelting of the final pellet product. For example, there can be used film-forming organic binders which are decomposed to harmless substances during subsequent drying, or calcining or during smelting. For example, various industrial gums, rubber latex, resins, starch, asphalt, coal, tar and pitch can be used as binding agents. Various cementitious binding agents can be used, for example, calcined lime, plaster of Paris, sodium silicates, portland cement, aluminous cements, sorel cements, etc. When a hydraulic cement is used as a binder, the water in the bridging liquid will effect hydration thereof to achieve hardening of the cement, in accordance with known techniques. Also, colloidal silica can be used as a binding agent. The amount of binding agent added to the slurry will be sufficient to impart the desired strength to the pellet product. The amount of binding agent can be in the range of from about 1 to 20 wt. %, based on the weight of the cement copper solids. The amount of the aqueous bridging liquid will be from about 6 to 20% by weight, based on the weight of the cement copper solids.

The slurry of pellets discharged from the agglomeration mechanism 14 is then fed to a filter device, such as a screen 15, whereby the freely drainable organic suspending liquid is separated from the pellets. Other apparatuses that can be used for this purpose include filters, settling vessels and centrifuges.

The pellets are then treated in order to remove the residual suspending liquid and aqueous bridging liquid, whereby to obtain substantially dry pellets. The pellets are fed to a dryer 16 wherein they are dried at a temperature effective to vaporize the aqueous bridging liquid and residual suspending liquid, for example, a temperature of about 350° F. when the suspending liquid is fuel oil. The pellet product is removed as the underflow of the dryer 16. The vapor overflow is fed to a condenser 17 whereby to condense the liquids. The liquids can be separated in the separator 18 and recycled.

The agglomerate product obtained in the FIG. 1 embodiment and the pellet product obtained in the FIG. 2 embodiment can be calcined if it is desired or necessary to provide same with higher crushing strength. Thus, as shown in FIG. 2, the pellet product is fed to a furnace 19 wherein it is calcined at a suitable temperature of from about 1700° to 1900° F. and the calcined product is then removed from the furnace.

EXAMPLE I

An aqueous cement copper sludge, containing about 60 percent by weight of cement copper solids having a particle size of minus 100 mesh is fed at a rate of about 5.625 tons per hour (TPH) into the vessel 1 wherein it is mixed with 11.25 TPH of water. A mixture of about 14.3% by weight of cocoamine, about 14.3% by weight of tall oil and 71.4% by weight of trichloroethane is flowed into the conduit 2 at a rate of about 0.95 TPH. The two streams are combined in conduit 2 and are fed to a pump loop 6 having a volumetric capacity of 180 GPM, whereby to provide an average residence time of the combined streams in the pump loop of about one minute. The discharge (slurry) of the pump loop is fed onto a screen 9 of 10 mesh size and 13.07 GPH of water and fine particles are removed as the underflow. The overflow (about 4.75 TPH, 9% water) is fed into a dryer 10 operating at 350° F., whereby about 0.4 TPH of water and about 0.92 TPH of organic phase are removed as vapor. The solids from dryer 10 comprise about 98.5 percent by weight of solids. There is recovered about 3.4 TPH of solids. The vapors are condensed in the condenser 11 and the organic phase is separated from the aqueous phase in the separator 12. The organic phase is a mixture of the bridging liquid and conditioners. The mixture of the bridging liquid and the conditioners is recycled to the beginning of the process.

EXAMPLE II

The solids discharged from dryer 10 in the process of Example I are mixed with fuel oil supplied at a rate of 12.8 TPH in the agglomerator 14 to form a suspension. Then sodium silicate (about 0.018 TPH) and water (about 0.5 TPH) are mixed together and are fed to the agglomerator 14 and are mixed with the suspension for an average residence time of the mixture in the pump loop of about one minute. The mixture is then fed to a screen 15 wherein 12.5 TPH of fuel oil is recovered as underflow. The overflow is fed to a dryer 16 operated at 350° F. Fuel oil is evaporated at a rate of about 0.3 TPH and water is evaporated at a rate of about 0.45 TPH. There is obtained about 3.6 TPH of copper cement pellets.

EXAMPLE III

The solids discharged from dryer 16 in Example II are calcined at 1800° F. in the furnace 19 and there is recovered about 3.5 TPH of copper cement pellets as the underflow.

Although particular preferred embodiments of the invention have been disclosed in detail for illustrative purposes, it will be recognized that variations or modifications of the disclosed process, lie within the scope of the present invention.

The embodiments of the invention in which an exclusive property or privilege is claimed are defined as follows:

1. A process for dewatering an aqueous cement copper slurry and forming agglomerates of the cement copper, said aqueous cement copper slurry having been prepared by contacting an aqueous leaching liquid containing dissolved copper salts with iron whereby to precipitate copper, the cement copper particles in said slurry having a particle size of less than about 100 mesh, said cement copper particles containing from about 60 to 90% copper and the balance being impurities, which comprises the steps of: adding to said aqueous cement copper slurry (a) hydrophobic organic bridging liquid and (b) liquid conditioner effective to displace water from the cement copper particles and to render the surfaces of the cement copper particles oleophilic whereby to form a two-phase liquid system wherein the cement copper particles are dispersed in and wetted by said bridging liquid and the other liquid phase is water essentially free of cement copper particles, agitating the two-phase liquid system to effect repeated collisions of said particles and thereby forming in said system a slurry of agglomerates in the water phase wherein said agglomerates consist essentially of the solid cement copper particles having said conditioner adsorbed thereon and bound together by said hydrophobic organic bridging liquid, discontinuing said agitating, separating said agglomerates from the freely drainable water and then drying said agglomerates to remove therefrom substantially all of said hydrophobic organic bridging liquid, said liquid conditioner and the remainder of the water.

2. A process according to claim 1 in which said dried agglomerates are suspended in a hydrophobic organic suspending liquid without adding said conditioner whereby to form a suspension, adding an aqueous bridging liquid and binding agent to said suspension, agitating same to effect repeated collisions of the agglomerates whereby to form a dispersion of pellets in said hydrophobic organic suspending liquid wherein the pellets are bridged by said aqueous bridging liquid and are impregnated and/or coated with said binding agent, then discontinuing said agitation, separating the pellets from the freely drainable hydrophobic suspending liquid, and then drying said pellets to remove therefrom substantially all of said hydrophobic organic suspending liquid and said water.

3. A process according to claim 1 including the step of calcining said agglomerates.

4. A process according to claim 2 including the step of calcining said pellets.

5. A process according to claim 1 in which said separating step is performed by mechanically separating free water from said agglomerates.

6. A process according to claim 2 in which said first separating step is performed by mechanically separating free water from said agglomerates and the second separating step is performed by mechanically separating the free hydrophobic suspending liquid from the pellets.

7. A process according to claim 1 or claim 2 wherein the amount of said hydrophobic organic bridging liquid is from 6 to 20 percent by weight and the amount of said liquid conditioning agent is from 0.1 to 10 percent by weight, both percentages being based on the weight of the cement copper solids.

8. A process according to claim 1 in which said hydrophobic organic liquid is selected from the group consisting of fuel oil, kerosene, perchloroethylene and trichloroethane, and said conditioner is selected from the group consisting of tall oil, xanthates, alcohols, long chain aliphatic amines and mixtures thereof.

9. A process according to claim 1 in which said hydrophobic organic liquid is trichloroethane and said conditioner is tall oil, cocoamine or mixture thereof.

10. A process according to claim 1 in which said cement copper slurry is prepared by mixing a cement copper sludge containing 30 to 70 wt. % cement copper particles with water to form a pumpable slurry containing up to about 20 wt. % of cement copper particles.

11. A process according to claim 2 in which the amount of binding agent added to said suspension is from 1 to 20 wt. %, based on the weight of the cement copper solids, and the amount of aqueous bridging liquid added to said suspension is from 6 to 20 wt. %, based on the weight of the cement copper solids.

* * * * *